United States Patent
Takahashi

(10) Patent No.: US 12,061,694 B2
(45) Date of Patent: Aug. 13, 2024

(54) SECURITY-TRAINING SUPPORT APPARATUS, SECURITY-TRAINING SUPPORT METHOD, AND COMPUTER READABLE RECORDING MEDIUM

(71) Applicant: NEC Corporation, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 17/618,963

(22) PCT Filed: Jun. 20, 2019

(86) PCT No.: PCT/JP2019/024602
§ 371 (c)(1),
(2) Date: Dec. 14, 2021

(87) PCT Pub. No.: WO2020/255359
PCT Pub. Date: Dec. 24, 2020

(65) Prior Publication Data
US 2022/0366041 A1 Nov. 17, 2022

(51) Int. Cl.
*G06F 21/55* (2013.01)
(52) U.S. Cl.
CPC ...... *G06F 21/554* (2013.01); *G06F 2221/031* (2013.01)
(58) Field of Classification Search
CPC ............. G06F 21/554; G06F 2221/031; G06F 21/556; G06F 21/563; G06F 2221/032; G06F 2221/034; G06F 2221/2111; G06F 21/55
See application file for complete search history.

(56) References Cited

U.S. PATENT DOCUMENTS

| | | | |
|---|---|---|---|
| 10,382,473 B1* | 8/2019 | Ashkenazy | H04L 63/1466 |
| 2016/0285907 A1 | 9/2016 | Nguyen et al. | |
| 2018/0288071 A1 | 10/2018 | Ikeda et al. | |
| 2020/0177618 A1* | 6/2020 | Hassanzadeh | G06F 21/552 |
| 2022/0008805 A1* | 1/2022 | Morton | A63B 71/0622 |

FOREIGN PATENT DOCUMENTS

| | | |
|---|---|---|
| JP | 2017-198836 A | 11/2017 |
| JP | 2018-173682 A | 11/2018 |
| WO | 2017/126041 A1 | 7/2017 |

OTHER PUBLICATIONS

English translation of Written opinion for PCT Application No. PCT/JP2019/024602, mailed on Aug. 6, 2019.
International Search Report for PCT Application No. PCT/JP2019/024602, malled on Aug. 6, 2019.

* cited by examiner

*Primary Examiner* — Quazi Farooqui

(57) ABSTRACT

A security-training support apparatus is an apparatus for generating a scenario of a targeted attack by a virtual attacker which is formed from a plurality of chronological steps and in which processing to be executed in each of the plurality of steps is defined. The security-training support apparatus includes: an information acquisition unit that at least acquires information specifying a set number of the plurality of steps; and a scenario generation unit that generates the scenario of the targeted attack by, until the set number is reached, selecting, for each of the plurality of steps, processing to be executed in the step from a database in which processing elements that can be executed in the step are registered.

12 Claims, 10 Drawing Sheets

Fig.3

TACTICAL INFORMATION

| STATE | TACTIC NAME |
|---|---|
| 1 | Collection |
| 1 | Discovery |
| 2 | Collection |
| 2 | Lateral Movement |

Fig.4

TECHNICAL INFORMATION

| APPLICABLE TACTIC | TECHNIQUE NAME | STATE | SUBSEQUENT STATE | NECESSARY INFORMATION | NECESSARY AUTHORITY | APPLICABLE ENVIRONMENT | RESULT OBTAINED |
|---|---|---|---|---|---|---|---|
| Collection | Data from local System | 1 | 1 | - | User | Windows, macOS, Linux | COLLECTION OF FILES AND DATA |
| Privilege Escalation | Bypass user Account Control | 1 | 1 | - | User, Administrator | Windows | EXECUTION OF APPLICATION FOR WHICH HIGH AUTHORITY IS REQUIRED |
| Discovery | Remote System Discovery | 1 | 2 | - | User, Administrator, SYSTEM | Windows, macOS, Linux | ACQUISITION OF HOST IP ADDRESSES AND PORT NUMBERS |

Fig.5

SOFTWARE INFORMATION

| APPLICABLE TECHNIQUE | SOFTWARE NAME | APPLICABLE ENVIRONMENT | EXECUTION TYPE | INPUT FORMAT | OUTPUT FORMAT |
|---|---|---|---|---|---|
| Data from local System | copy | Windows | CUI | Copy $source $target | - |
| Remote System Discovery | nmap | Windows, macOS, Linux | CUI | nmap-sP $ipaddress_with_sub Netmask \| grep "Nmap scan report" | Nmap scan report for $hostname ($ipaddress) |

| # | 1 | 2 | 3 | ... |
|---|---|---|---|---|
| TACTIC | $TA_1$ | $TA_2$ | | |
| TECHNIQUE | $TE_1$ | | | |
| SOFTWARE | $S_1$ | | | |

Fig.6B     GENERATION OF SCENARIO COMPLETED

| # | 1 | 2 | 3 | ... |
|---|---|---|---|---|
| TACTIC | $TA_1$ | $TA_2$ | $TA_3$ | |
| TECHNIQUE | $TE_1$ | $TE_2$ | $TE_3$ | |
| SOFTWARE | $S_1$ | $S_2$ | $S_3$ | |

ATTACK COMMAND SERVER

SECURITY-TRAINING SUPPORT APPARATUS, SECURITY-TRAINING SUPPORT METHOD, AND COMPUTER READABLE RECORDING MEDIUM

This application is a National Stage Entry of PCT/JP2019/024602 filed on Jun. 20, 2019, the contents of all of which are incorporated herein by reference, in their entirety.

TECHNICAL FIELD

The present invention relates to a security-training support apparatus and a security-training support method for supporting training against targeted attacks, and further relates to a computer readable recording medium that includes recorded thereon a program for executing the security-training support apparatus and the security-training support method.

BACKGROUND ART

Recent years have seen an increase in targeted attacks as cyber-attacks targeting companies, government offices, organizations, etc. In a targeted attack, a target system is illegally penetrated to exploit, destroy, and/or tamper data, inter alia. Furthermore, target attacks are started using emails, and there are cases in which it is difficult to judge whether or not a received email is a targeted-attack email. Thus, Patent Document 1 proposes a system for determining whether or not a transmitted email is a targeted-attack email.

Specifically, upon reception of a data file from a sender, the system disclosed in Patent Document 1 first makes an inquiry regarding the file name of the received data file to the sender. Then, if a file name that does not correspond to the file name of the received data file is received as a result of the inquiry or if the reception of a file name responsive to the inquiry cannot be detected within a predetermined period, the system disclosed in Patent Document 1 determines that there is an inconsistency between the data file and the sender.

However, there is a limit to emails that can be detected by the system disclosed in Patent Document 1, and the system disclosed in Patent Document 1, by itself, does not provide sufficient defense against targeted attacks. Furthermore, in a targeted attack, the attacker sets milestones toward the accomplishment of the ultimate goal, and in order to accomplish this, proceeds with the attack while selecting tools to be used stage by stage and also acquiring information regarding the target.

Thus, in order to ensure that a system is perfectly protected from targeted attacks, it is significant for the administrator of the system to carry out training simulating situations in which the system is subjected to targeted attacks. Furthermore, such training is carried out in accordance with a preset target attack scenario using an attack log and a defense log corresponding to the attack log.

LIST OF RELATED ART DOCUMENTS

Patent Document

Patent Document 1: Japanese Patent Laid-Open Publication No. 2018-173682

SUMMARY OF INVENTION

Problems to be Solved by the Invention

However, a company or the like subjected to a targeted attack does not disclose the attack and defense logs (in the following, these logs are collectively referred to as "logs") due to security reasons, and it is thus very difficult to acquire such logs. Thus, there is a problem that scenarios of various patterns and logs that are in accordance with the scenarios need to be prepared manually in order to carry out training in a complete manner, which incurs a very high cost.

An example object of the invention is to provide a security-training support apparatus, a security-training support method, and a computer readable recording medium that can overcome the above-described problem and can automatically generate scenarios necessary in training against targeted attacks.

Means for Solving the Problems

In order to achieve the above-described object, a security-training support apparatus according to an example aspect of the invention includes:
- an information acquisition unit configured to, in order to generate a scenario of a targeted attack by a virtual attacker which is formed from a plurality of chronological steps and in which processing to be executed in each of the plurality of steps is defined, at least acquire information specifying a set number of the plurality of steps; and
- a scenario generation unit configured to generate the scenario of the targeted attack by, until the set number is reached, selecting, for each of the plurality of steps, processing to be executed in the step from a database in which processing elements that can be executed in the step are registered.

In addition, in order to achieve the above-described object, a security-training support method according to an example aspect of the invention includes:
- (a) a step of, in order to generate a scenario of a targeted attack by a virtual attacker which is formed from a plurality of chronological steps and in which processing to be executed in each of the plurality of steps is defined, at least acquiring information specifying a set number of the plurality of steps; and
- (b) a step of generating the scenario of the targeted attack by, until the set number is reached, selecting, for each of the plurality of steps, processing to be executed in the step from a database in which processing elements that can be executed in the step are registered.

Furthermore, in order to achieve the above-described object, a computer readable recording medium according to an example aspect of the invention includes a program recorded thereon,
the program including instructions that cause a computer to carry out:
- (a) a step of, in order to generate a scenario of a targeted attack by a virtual attacker which is formed from a plurality of chronological steps and in which processing to be executed in each of the plurality of steps is defined, at least acquiring information specifying a set number of the plurality of steps; and
- (b) a step of generating the scenario of the targeted attack by, until the set number is reached, selecting, for each of the plurality of steps, processing to be executed in the step from a database in which processing elements that can be executed in the step are registered.

Advantageous Effects of the Invention

As described above, according to the invention, scenarios that are necessary in training against targeted attacks can be generated automatically.

BRIEF DESCRIPTION OF THE DRAWINGS

FIG. 3 is a diagram illustrating one example of tactical information registered in a database in first example embodiment.

FIG. 4 is a diagram illustrating one example of technical information registered in the database in first example embodiment.

FIG. 5 is a diagram illustrating one example of software information registered in the database in first example embodiment.

FIG. 6 is a diagram describing processing executed by a scenario generation unit 12 in first example embodiment, and FIG. 6A and FIG. 6B illustrate how a sequence of processing proceeds.

EXAMPLE EMBODIMENT

First Example Embodiment

In the following, a security-training support apparatus, a security-training support method, and a program in first example embodiment will be described with reference to FIGS. 1 to 7.

[Apparatus Configuration]

Figure 1:
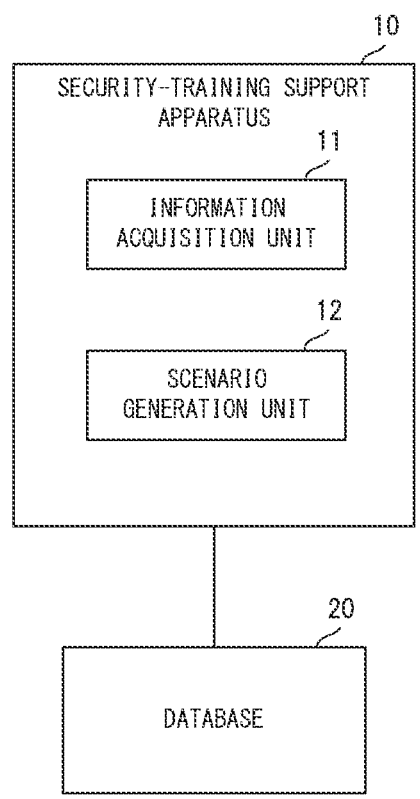
FIG. 1 is a block diagram schematically illustrating a configuration of a security-training support apparatus in first example embodiment.

First, a configuration of the security-training support apparatus in first example embodiment will be described with reference to FIG. 1. FIG. 1 is a block diagram schematically illustrating the configuration of the security-training support apparatus in first example embodiment.

Illustrated in FIG. 1 is a security-training support apparatus 10 in first example embodiment, which generates a scenario of a targeted attack and supports training against the targeted attack. A targeted attack as referred to herein is an attack by a virtual attacker which is formed from a plurality of chronological steps and in which processing to be executed in each of the plurality of steps is defined.

As illustrated in FIG. 1, the security-training support apparatus 10 includes an information acquisition unit 11 and a scenario generation unit 12. In order to generate the above-described scenario, the information acquisition unit 11 at least acquires information specifying a set number of steps forming the targeted attack. The scenario generation unit 12 generates the scenario of the targeted attack by, until the set number of steps is reached, selecting, for each of the steps, processing to be executed in the step from a database 20 in which processing elements that can be executed in the steps are registered.

As described above, in the present example embodiment, when a number of steps forming a targeted attack is set, processing to be executed in each of the steps is selected in accordance therewith and a scenario of the targeted attack is generated. Thus, according to the first example embodiment, scenarios that are necessary in training against targeted attacks can be generated automatically.

Figure 2:
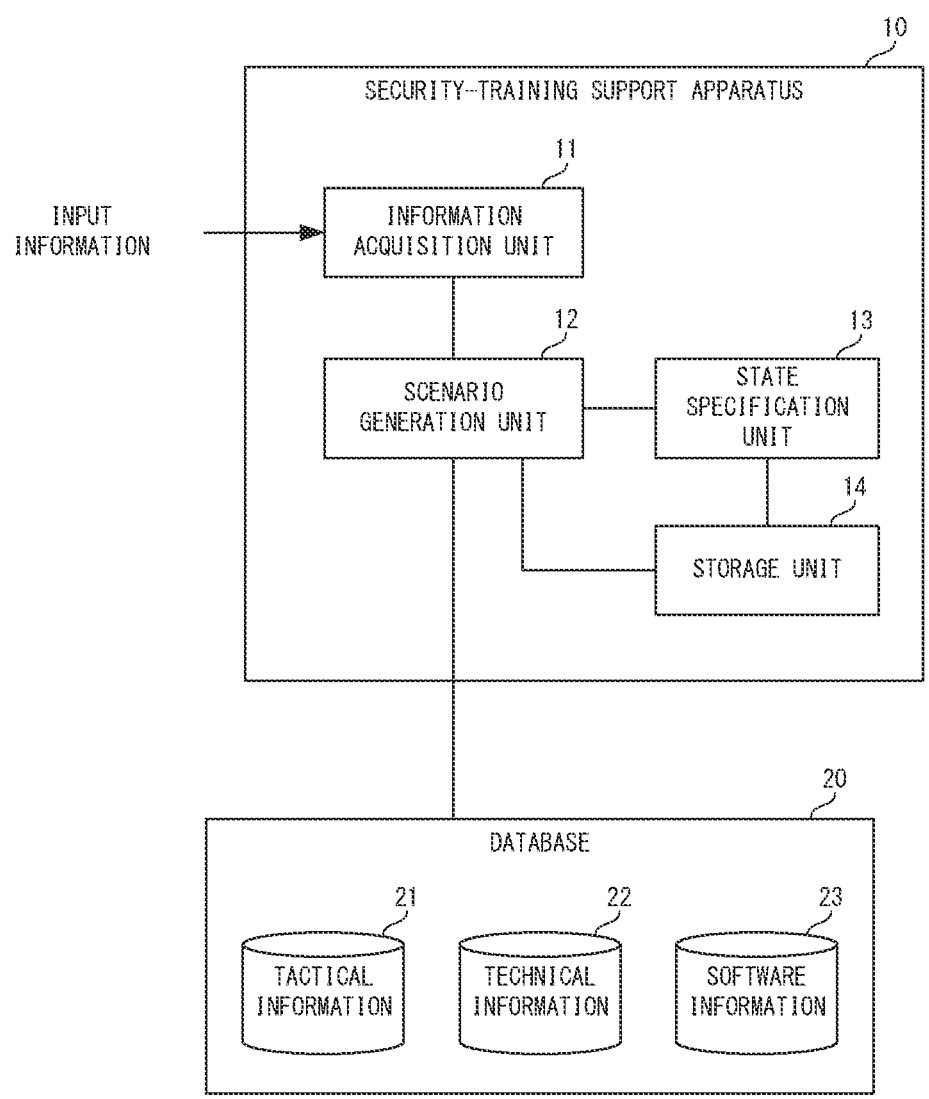
FIG. 2 is a block diagram illustrating the configuration of the security-training support apparatus in the example embodiment in more detail.

Next, the configuration and functions of the security-training support apparatus in first example embodiment will be described in more detail with reference to FIG. 2. FIG. 2 is a block diagram illustrating the configuration of the security-training support apparatus in the example embodiment in more detail.

As illustrated in FIG. 2, the security-training support apparatus 10 in first example embodiment includes a state specification unit 13 and a storage unit 14 in addition to the information acquisition unit 11 and the scenario generation unit 12 described above. Furthermore, the security-training support apparatus 10 is connected to a database 20 via a network.

In first example embodiment, the information acquisition unit 11 acquires, from a terminal device of an administrator or the like, information (referred to in the following as "environment information") specifying the environment in which the scenario is to be executed, in addition to the above-described information (referred to in the following as "set number information") specifying the set number. Specific examples of the information specifying the environment in which the scenario is to be executed include the operating system used in the terminals that are attack targets, and the IP addresses, network topology, etc., of the terminals that are attack targets. In addition to such information, the information acquisition unit 11 can also acquire information specifying techniques, software, etc., deployed by the virtual attacker. Furthermore, the information acquisition unit 11 stores the information so acquired to the storage unit 14.

Each time a step in the scenario of the targeted attack is generated by the scenario generation unit 12, the state specification unit 13 specifies the state of the virtual attacker and information acquired by the virtual attacker at that point. Furthermore, the state specification unit 13 stores the state of the virtual attacker and the information acquired by the virtual attacker so specified to the storage unit 14. Note that the specification of the state of the virtual attacker and the specification of the information acquired by the virtual attacker are performed based on the tactic, technique, and software selected in each step, as described later.

In first example embodiment, the scenario generation unit 12 selects, for each step in the scenario, the processing to be executed in the step from the database 20, based on the set number of steps and the state of the virtual attacker in an already-generated step in the scenario of the targeted attack, which are stored in the storage unit 14.

Here, the information registered in the database 20 will be described in detail with reference to FIGS. 3 to 5. FIG. 3 is a diagram illustrating one example of tactical information registered in the database in first example embodiment. FIG. 4 is a diagram illustrating one example of technical information registered in the database in first example embodiment. FIG. 5 is a diagram illustrating one example of software information registered in the database in first example embodiment.

First of all, in first example embodiment, the processing to be executed in each of the plurality of steps in the scenario of the targeted attack is defined by a tactic to be deployed in the step, a technique to be used in the step, and software necessary for the execution of processing in the step. Furthermore, the database 20 has registered therein: tactical information 21 specifying candidates of tactics that can be deployed in the steps; technical information 22 specifying candidates of techniques that can be used in the steps; and software information 23 specifying candidates of software that can be used for the execution of processing in the steps.

Specifically, as illustrated in FIG. 3, the tactical information 21 includes, for each tactic, a "tactic name" and a "state" indicating the state of the virtual attacker in a case in which the tactic is deployed. Furthermore, as illustrated in FIG. 4, the technical information 22 includes, for each technique, an "applicable tactic", a "technique name", a "state" indicating the state of the virtual attacker in a case in which the technique is deployed, a "subsequent state" indicating the state of the virtual attacker after the technique is deployed, "necessary information", "necessary authority", "applicable environment", and "result obtained". Note that an example of the "necessary information" in FIG. 4 is the above-described environment information, for example. Also, an example of the "applicable environment" is the environment of the terminal operated by the virtual attacker.

Furthermore, as illustrated in FIG. 5, the software information 23 includes, for each piece of software, an "applicable technique", a "software name", "applicable environment", an "execution type", an "input format", and an "output format".

Figure 6A:

Next, the functions of the scenario generation unit 12 and the state specification unit 13 will be described in detail with reference to FIG. 6. FIG. 6 is a diagram describing processing executed by the scenario generation unit 12 in first example embodiment, and FIG. 6A and FIG. 6B illustrate how a sequence of processing proceeds.

First, for each step (#=1, 2, . . . ) forming the targeted attack, the scenario generation unit 12 selects the tactic ($TA_1$, $TA_2$, $TA_3$, . . . ) to be deployed in the step from the tactical information 21 in the database 20, as illustrated in (a) in FIG. 6A. Specifically, the scenario generation unit 12 first specifies the "state" of the virtual attacker and the retained "environment information" from the information stored in the storage unit 14, and also specifies tactics matching the specified state from the tactical information 21. Then, based on a preset rule, the scenario generation unit 12 selects the tactic to be deployed in the step for which the selection is being performed from among the specified tactics.

Next, for each step, the scenario generation unit 12 selects the technique ($TE_1$, $TE_2$, $TE_3$, . . . ) to be used in the step from the technical information 22 in the database 20. Specifically, based on the technical information 22, the scenario generation unit 12 specifies, from among the techniques applicable to the earlier selected tactic, techniques matching the earlier-specified "state", the retained "environment information", and the "environment of the terminal operated by the virtual attacker". Furthermore, based on the preset rule, the scenario generation unit 12 selects the technique to be used in the step for which the selection is being performed from among the specified techniques.

Subsequently, the scenario generation unit 12 selects the software ($S_1$, $S_2$, $S_3$, . . . ) necessary for the execution of processing in the step from the software information 23 in the database 20. Specifically, based on the software information 23, the scenario generation unit 12 specifies a piece of software of which the "applicable environment" matches the "environment of the terminal operated by the virtual attacker" from among pieces of software applicable to the earlier selected technique, and selects the specified software.

Furthermore, examples of the above-described rule include rules that change chronologically and rules simulating virtual attacker behavior, for example. Among such rules, an example of a rule that changes chronologically is the following rule, for example: "select a tactic and technique for spreading the infected range in steps corresponding to the initial stage in the scenario, select a tactic and technique for discovering important information in steps corresponding to the intermediate stage in the scenario, and select a tactic and technique for taking out the important information discovered and a tactic and technique for erasing traces in steps corresponding to the final stage in the scenario". Furthermore, the distinction between the initial, intermediate, and final stages is made, as appropriate, in accordance with the set number of steps.

An example of a tactic for spreading the infected range is "Lateral Movement". Examples of techniques for spreading the infected range include "Remote Desktop Protocol" for spreading the infected range using Remote Desktop Services, and "Exploitation of Remote Services" for spreading the infected range using the vulnerability of remote services (SMB, MySQL, etc.).

An example of a tactic for discovering important information is "Discovery". Examples of techniques for discovering important information include "Remote System Discovery" for searching for terminals other than the penetrated terminal in the penetrated network environment, and "File and Directory Discovery" for acquiring files, directory lists, and specific types of information on the penetrated terminal or network. Furthermore, specific examples of "Remote System Discovery" include the ping and netview commands. Specific examples of "File and Directory Discovery" include the dir and tree commands.

An example of a tactic for taking out important information discovered is "Exfiltration". Examples of techniques for taking out important information discovered include "Exfiltration Over Command and Control Channel" for taking out information using the same path as the communication path for attack instructions, and "Exfiltration Over Physical Medium" for taking out information via a physical medium. Specific examples of "Exfiltration Over Command and Control Channel" include HTTPGET and email. Specific examples of "Exfiltration Over Physical Medium" include USB drives and portable telephones.

An example of a tactic for erasing traces is "Defense Evasion". Examples of techniques for erasing traces include "Indicator Removal on Host" for deleting logs including traces of attack activity, and "File Deletion" for deleting files used in attack activity. A specific example of "Indicator Removal on Host" is wevtutil cl system (clearing of Windows event logs). Specific examples of "File Deletion" include the rm and del commands.

Furthermore, an example of a rule simulating virtual attacker behavior is the following rule, for example: "if a tactic and technique for attack persistence have not been applied to a terminal in an environment that is the present attack target, select a tactic and technique relating to attack persistence for the terminal".

An example of a tactic relating to attack persistence is "Persistence". An example of a technique relating to attack persistence is "Scheduled Task" for setting as a scheduled task the execution of programs at a specific time or the execution of programs on a regular basis. Furthermore, specific examples of "Scheduled Task" include the schtasks and at commands.

Incidentally, an attack is executed interactively in a targeted attack. Furthermore, the path (TCP session, connection using a legitimate account) for this interactive attack may be lost as a result of a system reboot, a change in authentication information, etc. Thus, a virtual attacker deploys a tactic and technique for sustaining the attack in the penetrated terminal. These correspond to the above-described tactic and technique relating to attack persistence. Furthermore, once a technique relating to attack persistence is applied to a terminal, the effect of the technique on the same terminal endures. Thus, the technique is applied only to terminals to which the technique has not yet been applied.

For example, suppose that a RAT client is operating on a penetrated terminal and a RAT server is operating on a virtual attacker terminal. In this case, since the virtual attacker transmits operation instructions relating to the attack over a firewall, a session is typically established from the RAT client side (penetrated terminal side) to the RAT server side (virtual attacker terminal). However, if the penetrated terminal is shut down by a legitimate user, the virtual attacker can no longer transmit operation instructions unless the RAT client is executed after reboot. Thus, the virtual attacker executes an attack scheme allowing the attack to be sustained by using "Scheduled Task" described above and adding the following setting to scheduled tasks of the penetrated terminal: "execute RAT client upon bootup".

Furthermore, in first example embodiment, when a tactic, technique, and software have been selected by the scenario generation unit 12, the state specification unit 13 specifies the "state" corresponding to the selected tactic and sets the specified "state" as the state of the virtual attacker. In addition, the state specification unit 13 specifies the "result obtained" corresponding to the selected technique, and also specifies the information acquired by the virtual attacker based on the "result obtained". Then, the state specification unit 13 stores the state of the virtual attacker and the information acquired by the virtual attacker so specified to the storage unit 14.

Furthermore, as illustrated in (b) of FIG. 6, the generation of the scenario of the target attack is completed when a termination condition is satisfied. Examples of the termination condition include, inter alia, the condition that the number of generated steps, i.e., the number of steps for which a tactic, technique, and software have been selected has reached the set number.

Furthermore, the scenario generation unit 12 can ultimately extract a sequence of pieces of selected software and transmit this sequence to a server (referred to in the following as an "attack command server") that can execute a virtual targeted attack in accordance with the scenario of the targeted attack. Note that the attack command server will be described in detail in second example embodiment.

[Apparatus Operations]

Figure 7:
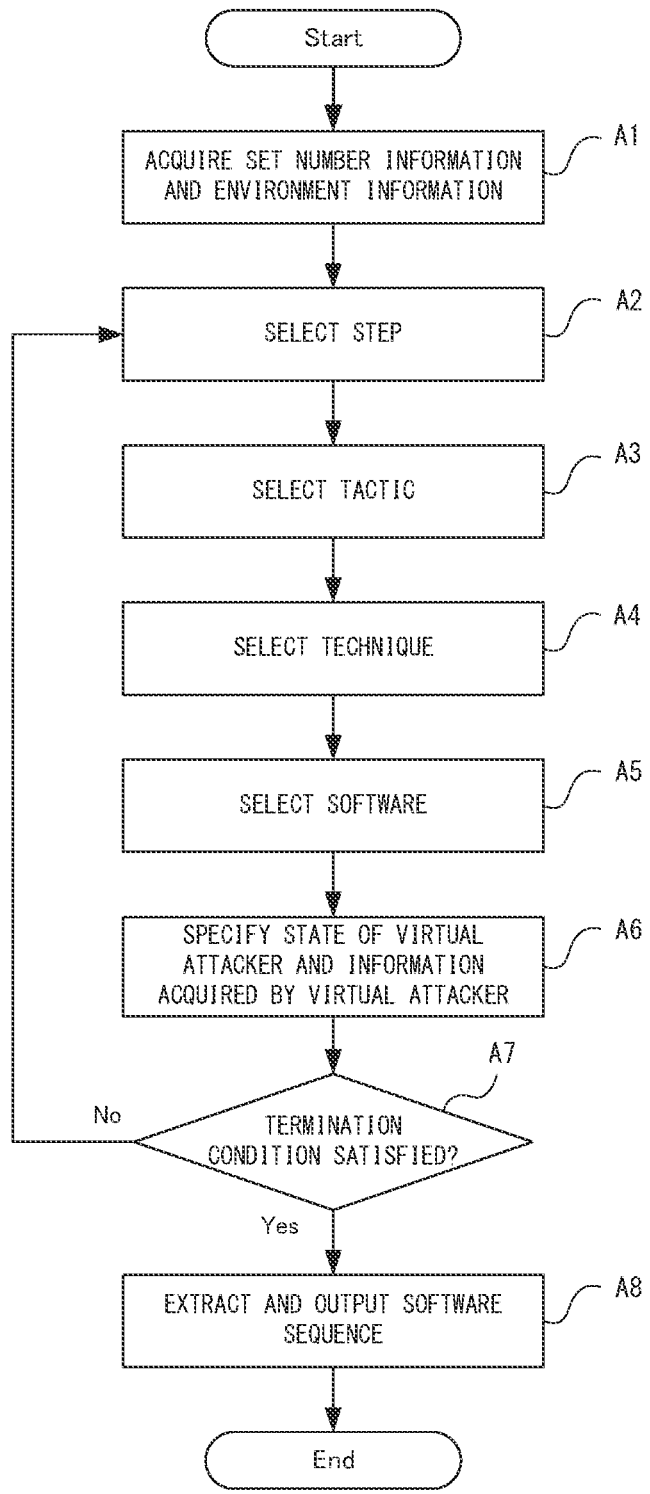
FIG. 7 is a flowchart illustrating operations of the security-training support apparatus in first example embodiment.

Next, operations of the security-training support apparatus 10 in first example embodiment will be described with reference to FIG. 7. FIG. 7 is a flowchart illustrating the operations of the security-training support apparatus in first example embodiment. FIGS. 1 to 6 will be referred to as needed in the following description. Furthermore, in first example embodiment, the security-training support method is implemented by causing the security-training support apparatus 10 to operate. Accordingly, the following description of the operations of the security-training support apparatus 10 is substituted for the description of the security-training support method in the first example embodiment.

As illustrated in FIG. 7, first, the information acquisition unit 11 acquires the set number information and the environment information from the terminal of the administrator or the like of the security-training support apparatus 10 (step A1). Furthermore, the information acquisition unit 11 stores the set number information and the environment information so acquired to the storage unit 14.

Next, the scenario generation unit 12 selects a step for which later-described steps A3 to A5 have not yet been performed and which has the smallest number (step A2).

Next, the scenario generation unit 12 specifies the "state" of the virtual attacker and also the retained "environment information" from the information stored in the storage unit 14, and for the step selected in step A2, selects a tactic matching the specified state of the virtual attacker from the tactical information 21 in the database 20 (step A3).

Next, for the step selected in step A2, the scenario generation unit 12 selects, from among the techniques applicable to the tactic selected in step A3 in the technical information 22 in the database 20, a technique matching the earlier-specified "state", the retained "environment information", and the "environment of the terminal operated by the virtual attacker" (step A4).

Next, for the step selected in step A2, the scenario generation unit 12 selects, from among pieces of software applicable to the technique selected in step A4 in the software information 23 in the database 20, software of which the "applicable environment" matches the "environment of the terminal operated by the virtual attacker" (step A5).

Next, after step A5 is executed, the state specification unit 13 specifies, for the step selected in step A2, the state of the virtual attacker and the information acquired by the virtual attacker (step A6). Furthermore, the state specification unit 13 stores the state of the virtual attacker and the information acquired by the virtual attacker so specified to the storage unit 14.

Next, after step A6 is executed, the scenario generation unit 12 determines whether or not the termination condition is satisfied (step A7). Specifically, the scenario generation unit 12 determines whether or not the number of steps for which steps A3 to A5 have been executed has reached the set number specified by the set number information already acquired in step A1.

If the termination condition is not satisfied according to the result of the determination in step A7, the scenario generation unit 12 executes step A2 again. On the other hand, if the termination condition is satisfied according to the result of the determination in step A7, the scenario generation unit 12 extracts a sequence of the pieces of software selected in the steps and outputs the software sequence to the outside (step A8). An example of the output destination is a server (refer to second example embodiment) that can execute a virtual targeted attack in accordance with the scenario of the target attack.

Effects of First Example Embodiment

As described above, a scenario of a targeted attack is generated automatically in first example embodiment. Furthermore, in first example embodiment, a sequence of pieces of software selected during the generation of the scenario can be transmitted to an attack command server that executes a virtual targeted attack. Accordingly, logs of the targeted attack can also be generated automatically by acquiring logs during the attack by the attack command server.

Modification of First Example Embodiment

In the above-described example, the processing to be executed in each step of the scenario of the targeted attack is defined by three layers, namely a tactic, a technique, and software. However, first example embodiment is not limited to this form. In first example embodiment, the processing to be executed in each step of the scenario of the targeted attack may be defined by two layers, namely the purpose of the step and the means necessary for the execution of the processing.

In this case, candidates of the purpose of the step and candidates of means that can be used for the execution of the processing in the step are registered in the database 20. Furthermore, for each step, the scenario generation unit 12 selects the purpose of the step and also selects the means necessary for the execution of the processing in the step from the database 20. If each step is defined by two layers in such a manner, the steps would be simplified and the scenario would thus become intuitively understandable to people.

Furthermore, in first example embodiment, the number of layers defining the processing to be executed in each step in the scenario of the targeted attack is not limited to two or three as described above, and any number of layers may be adopted.

[Program]

It suffices for the program in first example embodiment to be a program that causes a computer to carry out steps A1 to A8 illustrated in FIG. 7. By installing this program on a computer and executing the program, the security-training support apparatus 10 and the security-training support method in first example embodiment can be realized. In this case, the processor of the computer functions and performs processing as the information acquisition unit 11, the scenario generation unit 12, and the state specification unit 13.

Furthermore, the program in first example embodiment may be executed by a computer system formed from a plurality of computers. In this case, the computers may each function as one of the information acquisition unit 11, the scenario generation unit 12, and the state specification unit 13, for example.

Second Example Embodiment

Next, the security-training support apparatus, the security-training support method, and the program in second example embodiment will be described with reference to FIGS. 8 and 9.

[Apparatus Configuration]

First, a configuration of the security-training support apparatus in second example embodiment will be described with reference to FIG. 8. FIG. 8 is a block diagram illustrating a configuration of the security-training support apparatus in second example embodiment.

Figure 8:
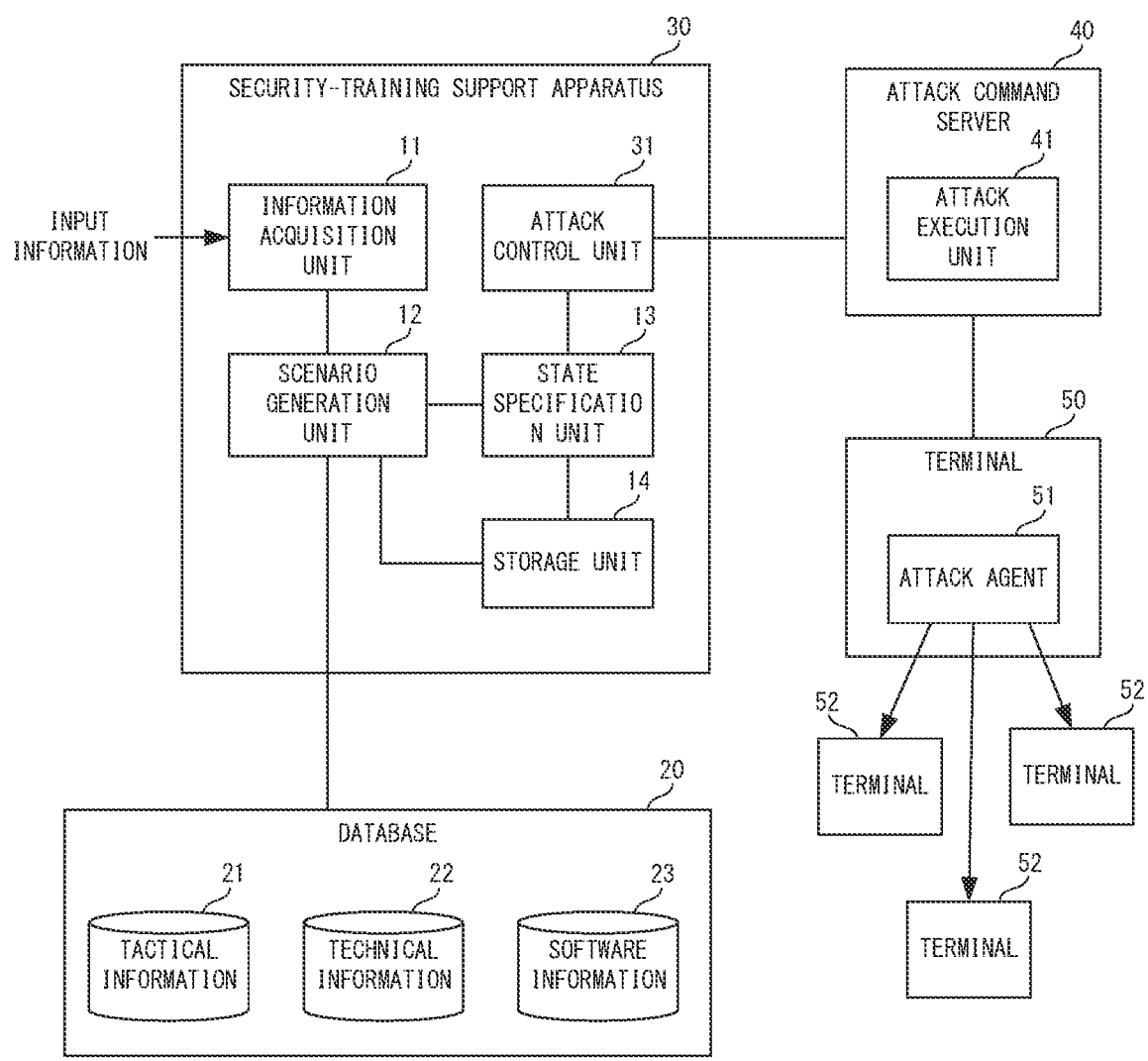
FIG. 8 is a block diagram illustrating a configuration of the security-training support apparatus in second example embodiment.

A security-training support apparatus 30 in second example embodiment, similarly to the security-training support apparatus 10 in first example embodiment, includes the information acquisition unit 11, the scenario generation unit 12, the state specification unit 13, and the storage unit 14, as illustrated in FIG. 8. However, the security-training support apparatus 30 in second example embodiment includes an attack control unit 31 in addition to these units, and differs from first example embodiment in this regard. In the following, description is provided focusing on the differences from first example embodiment.

Each time a step in the scenario of the targeted attack is generated by the scenario generation unit 12, the attack control unit 31 transmits the details of the generated step to an attack command server 40. Specifically, the attack control unit 31 converts information of the software selected in the generated step into an executable format such as a command sequence in accordance with the execution environment of the system that is the attack target, and transmits the software with the converted format to the attack command server 40.

The attack command server 40 is a server that executes a virtual targeted attack in accordance with the scenario of the targeted attack generated by the security-training support apparatus 30, and includes an attack execution unit 41. When information of the software with the converted format, e.g., a command sequence that can be executed by an attack agent, is transmitted from the attack command server 40 as details of the step, the attack execution unit 41 transmits the transmitted command sequence to a terminal 50 in which an attack agent 51 resides. Thus, the attack agent 51 residing in the terminal 50 is activated, and executes the transmitted command sequence to attack other terminals 52.

In addition, the attack agent 51 in the terminal 50 acquires logs in the terminals 52, files collected by the terminals 52, etc., and transmits such information as information (referred to in the following as "attack result information") indicating results of the attack to the attack execution unit 41. Furthermore, the attack execution unit 41 transmits, to the security-training support apparatus 30, the attack result information transmitted from the attack agent 51.

When the attack result information is transmitted, the attack control unit 31 in the security-training support apparatus 30 acquires the attack result information and transfers the acquired attack result information to the state specification unit 13.

The state specification unit 13 also specifies the state of the virtual attacker and the information acquired by the virtual attacker after the selection by the scenario generation unit 12 in second example embodiment, as is the case in first example embodiment. However, in second example embodiment, the state specification unit 13 specifies the information acquired by the virtual attacker based on the attack result information received from the attack control unit 31.

[Apparatus Operations]

Next, operations of the security-training support apparatus 30 in second example embodiment will be described with reference to FIG. 9. FIG. 9 is a flowchart illustrating the operations of the security-training support apparatus in second example embodiment. FIG. 8 will be referred to as needed in the following description. Furthermore, in second example embodiment, the security-training support method is implemented by causing the security-training support apparatus 30 to operate. Accordingly, the following description of the operations of the security-training support apparatus 30 is substituted for the description of the security-training support method in the present example embodiment.

Figure 9:
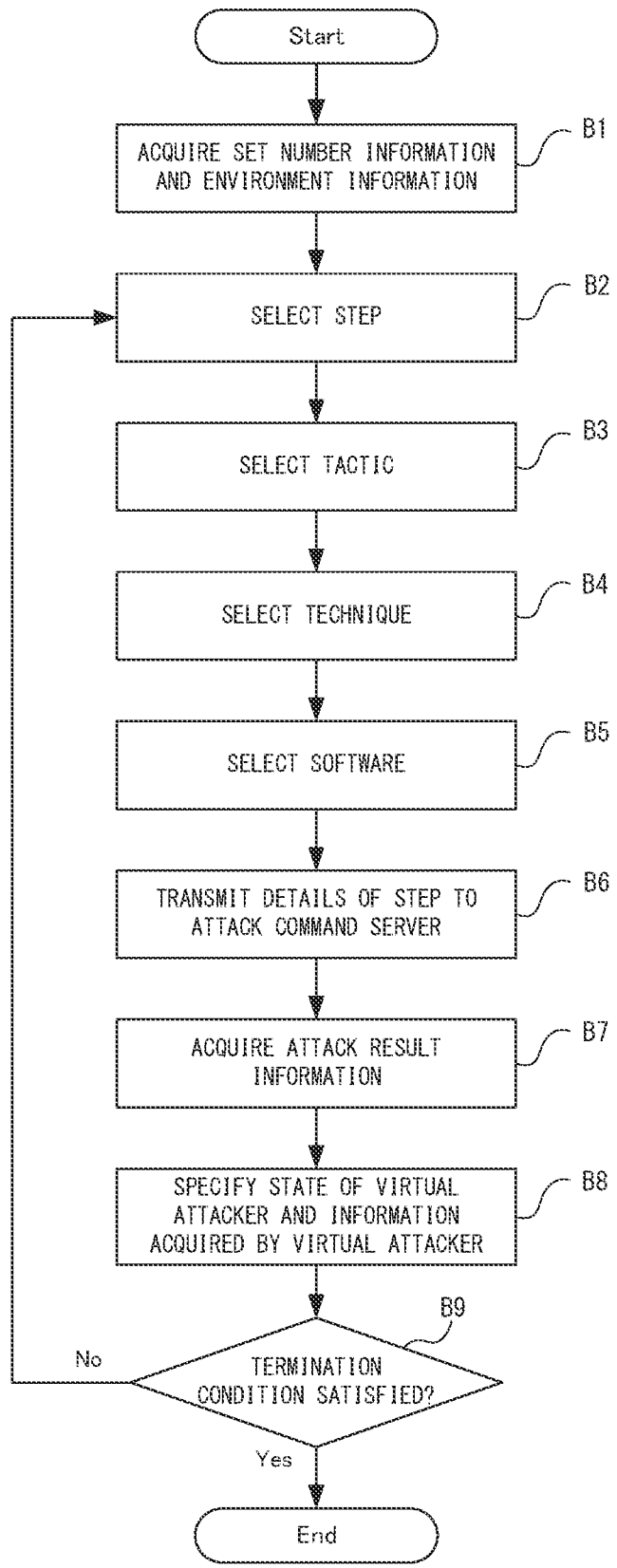
FIG. 9 is a flowchart illustrating operations of the security-training support apparatus in second example embodiment.

As illustrated in FIG. 9, first, the information acquisition unit 11 acquires the set number information and the environment information from the terminal device of the administrator or the like (step B1). Furthermore, the information acquisition unit 11 stores the set number information and the environment information so acquired to the storage unit 14.

Next, the scenario generation unit 12 selects a step for which later-described steps B3 to B5 have not yet been performed and which has the smallest number (step B2).

Next, the scenario generation unit 12 specifies the "state" of the virtual attacker and also the retained "environment information" from the information stored in the storage unit 14, and for the step selected in step B2, selects a tactic matching the specified state of the virtual attacker from the tactical information 21 in the database 20 (step B3).

Next, for the step selected in step B2, the scenario generation unit 12 selects, from among the techniques applicable to the tactic selected in step B3 in the technical information 22 in the database 20, a technique matching the earlier-specified "state", the retained "environment information", and the "environment of the terminal operated by the virtual attacker" (step B4).

Next, for the step selected in step B2, the scenario generation unit 12 selects, from among pieces of software applicable to the technique selected in step B4 in the software information 23 in the database 20, software of which the "applicable environment" matches the "environment of the terminal operated by the virtual attacker" (step B5). Steps B1 to B5 are similar to steps A1 to A5 described in first example embodiment.

Upon completion of step B5, a scenario has been generated for the step selected in step B2. Accordingly, the attack control unit 31 transmits the details of the generated step to the attack command server 40 (step B6).

When step B6 is executed, the attack execution unit 41 in the attack command server 40 activates the attack agent 51 residing in the terminal 50 and executes an attack in accordance with the details of the generated step. Furthermore, upon receiving the attack result information from the attack agent 51, the attack execution unit 41 transmits the received attack result information to the security-training support apparatus 30.

Next, when the attack result information is transmitted, the attack control unit 31 in the security-training support apparatus 30 acquires the transmitted attack result information and transfers the acquired attack result information to the state specification unit 13 (step B7).

Then, for the step selected in step B2, the state specification unit 13 specifies the state of the virtual attacker and also specifies the information acquired by the virtual attacker based on the attack result information (step B8). Furthermore, the state specification unit 13 stores the state of the virtual attacker and the information acquired by the virtual attacker so specified to the storage unit 14.

Next, after step B8 is executed, the scenario generation unit 12 determines whether or not the termination condition is satisfied (step B9). Specifically, the scenario generation unit 12 determines whether or not the number of steps for which steps B3 to B5 have been executed has reached the set number specified by the set number information already acquired in step B1.

If the termination condition is not satisfied according to the result of the determination in step B9, the scenario generation unit 12 executes step B2 again. On the other hand, if the termination condition is satisfied according to the result of the determination in step B9, the processing in the security-training support apparatus 30 is terminated.

[Program]

It suffices for the program in second example embodiment to be a program that causes a computer to carry out steps B1 to B9 illustrated in FIG. 9. By installing this program on a computer and executing the program, the security-training support apparatus 30 and the security-training support method in second example embodiment can be realized. In this case, the processor of the computer functions and performs processing as the information acquisition unit 11, the scenario generation unit 12, the state specification unit 13, and the attack control unit 31.

Furthermore, the program in second example embodiment may be executed by a computer system formed from a plurality of computers. In this case, the computers may each function as one of the information acquisition unit 11, the scenario generation unit 12, the state specification unit 13, and the attack control unit 31, for example.

Effects of Second Example Embodiment

As described above, a scenario of a targeted attack and logs of the targeted attack can be generated automatically also in second example embodiment. Furthermore, since attack results are fed back for each step in the scenario, a scenario of a targeted attack with higher effectiveness is generated in second example embodiment.

(Physical Configuration)

Figure 10:
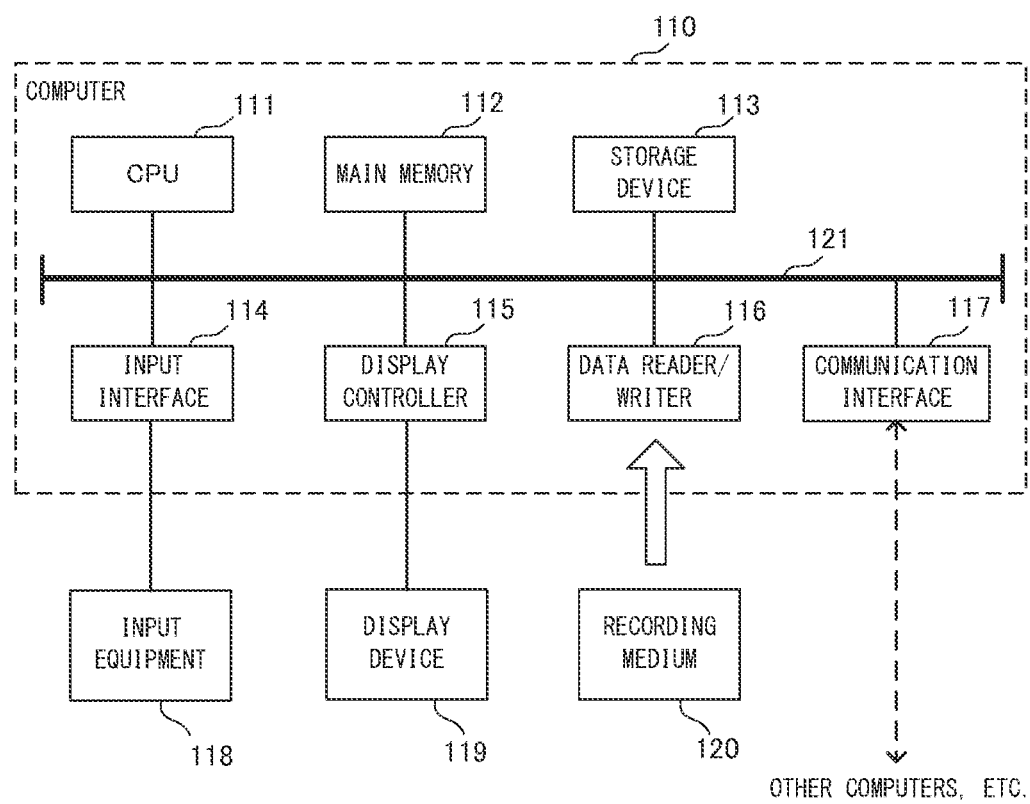
FIG. 10 is a block diagram illustrating one example of a computer for realizing the security-training support apparatus in example embodiments 1 and 2.

Here, a computer that realizes the security-training support apparatus by executing the program in example embodiments 1 and 2 will be described with reference to FIG. 10. FIG. 10 is a block diagram illustrating one example of a computer for realizing the security-training support apparatus in example embodiments 1 and 2.

As illustrated in FIG. 10, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another. Furthermore, the computer 110 may include a graphics processing unit (GPU) or a field-programmable gate array (FPGA) in addition to the CPU 111 or in place of the CPU 111.

The CPU 111 loads the program (codes) in the example embodiments, which is stored in the storage device 113, onto the main memory 112, and performs various computations by executing these codes in a predetermined order. The main memory 112 is typically a volatile storage device such as a dynamic random access memory (DRAM). Furthermore, the program in the example embodiments is provided in a state such that the program is stored in a computer readable recording medium 120. Note that the program in the example embodiments may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure. Digital (SD) card, a magnetic recording medium such as a flexible disk, and an optical recording medium such as a compact disk read-only memory (CD-ROM).

Note that the security-training support apparatus in the example embodiments can also be realized by using pieces of hardware corresponding to the respective units, rather than using a computer on which the program is installed. Furthermore, a portion of the security-training support apparatus may be realized by using the program, and the remaining portion of the security-training support apparatus may be realized by using hardware.

While a part of or the entirety of the above-described example embodiments can be expressed by (Supplementary note 1) to (Supplementary note 15) described in the following, the invention is not limited to the following description.

(Supplementary Note 1)

A security-training support apparatus including:
- an information acquisition unit configured to, in order to generate a scenario of a targeted attack by a virtual attacker which is formed from a plurality of chronological steps and in which processing to be executed in each of the plurality of steps is defined, at least acquire information specifying a set number of the plurality of steps; and
- a scenario generation unit configured to generate the scenario of the targeted attack by, until the set number is reached, selecting, for each of the plurality of steps, processing to be executed in the step from a database in which processing elements that can be executed in the step are registered.

(Supplementary Note 2)

The security-training support apparatus according to Supplementary note 1, wherein the scenario generation unit selects, for each of the plurality of steps, the processing to be executed in the step from the database based on a state of the virtual attacker in an already-generated step in the scenario of the targeted attack.

(Supplementary Note 3)

The security-training support apparatus according to Supplementary note 1 or 2, wherein
- the processing to be executed in each of the plurality of steps in the scenario of the targeted attack is defined by the purpose of the step and the means that is necessary for the execution of the processing, and
- the scenario generation unit generates the scenario of the targeted attack by
- selecting, for each of the plurality of steps, the purpose of the step from a database in which candidates of the purpose of the step are registered, and
- selecting, for each of the plurality of steps, the means that is necessary for the execution of the processing in the step from a database in which candidates of means that can be used for the execution of the processing in the step are registered.

(Supplementary Note 4)

The security-training support apparatus according to Supplementary note 1 or 2, wherein
- the processing to be executed in each of the plurality of steps in the scenario of the targeted attack is defined by a tactic to be deployed in the step, a technique to be used in the step, and software that is necessary for the execution of the processing in the step, and
- the scenario generation unit generates the scenario of the targeted attack by
- selecting, for each of the plurality of steps, a tactic to be deployed in the step from a database in which candidates of tactics that can be deployed in the step are registered,
- selecting, for each of the plurality of steps, a technique to be used in the step from a database in which candidates of techniques that can be used in the step are registered, and
- selecting, for each of the plurality of steps, software that is necessary for the execution of the processing in the step from a database in which candidates of software that can be used for the execution of the processing in the step are registered.

(Supplementary Note 5)

The security-training support apparatus according to any one of Supplementary notes 1 to 4 further including
- an attack control unit configured to, each time a step in the scenario of the targeted attack is generated by the scenario generation unit, transmit details of the generated step to a server that can execute a virtual targeted attack in accordance with the scenario of the targeted attack, cause the server to execute the generated step, and acquire an execution result.

(Supplementary Note 6)

A security-training support method including:
- (a) a step of, in order to generate a scenario of a targeted attack by a virtual attacker which is formed from a plurality of chronological steps and in which processing to be executed in each of the plurality of steps is defined, at least acquiring information specifying a set number of the plurality of steps; and
- (b) a step of generating the scenario of the targeted attack by, until the set number is reached, selecting, for each of the plurality of steps, processing to be executed in the step from a database in which processing elements that can be executed in the step are registered.

(Supplementary Note 7)

The security-training support method according to Supplementary note 6, wherein
- in the (b) step, for each of the plurality of steps, the processing to be executed in the step is selected from the database based on a state of the virtual attacker in an already-generated step in the scenario of the targeted attack.

(Supplementary Note 8)

The security-training support method according to Supplementary note 6 or 7, wherein
- the processing to be executed in each of the plurality of steps in the scenario of the targeted attack is defined by the purpose of the step and the means that is necessary for the execution of the processing, and
- in the (b) step, the scenario of the targeted attack is generated by
- selecting, for each of the plurality of steps, the purpose of the step from a database in which candidates of the purpose of the step are registered, and
- selecting, for each of the plurality of steps, the means that is necessary for the execution of the processing in the step from a database in which candidates of means that can be used for the execution of the processing in the step are registered.

(Supplementary Note 9)

The security-training support method according to Supplementary note 6 or 7, wherein
- the processing to be executed in each of the plurality of steps in the scenario of the targeted attack is defined by a tactic to be deployed in the step, a technique to be used in the step, and software that is necessary for the execution of the processing in the step, and
- in the (b) step, the scenario of the targeted attack is generated by
- selecting, for each of the plurality of steps, a tactic to be deployed in the step from a database in which candidates of tactics that can be deployed in the step are registered,
- selecting, for each of the plurality of steps, a technique to be used in the step from a database in which candidates of techniques that can be used in the step are registered, and selecting, for each of the plurality of steps, software that is necessary for the execution of the processing in the step from a database in which candidates of software that can be used for the execution of the processing in the step are registered.

(Supplementary Note 10)

The security-training support method according to any one of Supplementary notes 6 to 9 further including (c) a step of, each time a step in the scenario of the targeted attack is generated by the (b) step, transmitting details of the generated step to a server that can execute a virtual targeted attack in accordance with the scenario of the targeted attack, causing the server to execute the generated step, and acquiring an execution result.

(Supplementary Note 11)

A computer readable recording medium that includes a program recorded thereon, the program including instructions that cause a computer to carry out:

(a) a step of, in order to generate a scenario of a targeted attack by a virtual attacker which is formed from a plurality of chronological steps and in which processing to be executed in each of the plurality of steps is defined, at least acquiring information specifying a set number of the plurality of steps; and (b) a step of generating the scenario of the targeted attack by, until the set number is reached, selecting, for each of the plurality of steps, processing to be executed in the step from a database in which processing elements that can be executed in the step are registered.

(Supplementary Note 12)

The computer readable recording medium according to Supplementary note 11, wherein in the (b) step, for each of the plurality of steps, the processing to be executed in the step is selected from the database based on a state of the virtual attacker in an already-generated step in the scenario of the targeted attack.

(Supplementary Note 13)

The computer readable recording medium according to Supplementary note 11 or 12, wherein the processing to be executed in each of the plurality of steps in the scenario of the targeted attack is defined by the purpose of the step and the means that is necessary for the execution of the processing, and in the (b) step, the scenario of the targeted attack is generated by selecting, for each of the plurality of steps, the purpose of the step from a database in which candidates of the purpose of the step are registered, and selecting, for each of the plurality of steps, the means that is necessary for the execution of the processing in the step from a database in which candidates of means that can be used for the execution of the processing in the step are registered.

(Supplementary Note 14)

The computer readable recording medium according to Supplementary note 11 or 12, wherein the processing to be executed in each of the plurality of steps in the scenario of the targeted attack is defined by a tactic to be deployed in the step, a technique to be used in the step, and software that is necessary for the execution of the processing in the step, and in the (b) step, the scenario of the targeted attack is generated by selecting, for each of the plurality of steps, a tactic to be deployed in the step from a database in which candidates of tactics that can be deployed in the step are registered, selecting, for each of the plurality of steps, a technique to be used in the step from a database in which candidates of techniques that can be used in the step are registered, and selecting, for each of the plurality of steps, software that is necessary for the execution of the processing in the step from a database in which candidates of software that can be used for the execution of the processing in the step are registered.

(Supplementary Note 15)

The computer readable recording medium according to any one of Supplementary notes 11 to 14 further including (c) a step of, each time a step in the scenario of the targeted attack is generated by the (b) step, transmitting details of the generated step to a server that can execute a virtual targeted attack in accordance with the scenario of the targeted attack, causing the server to execute the generated step, and acquiring an execution result.

The invention has been described with reference to example embodiments above, but the invention is not limited to the above-described example embodiments. Within the scope of the invention, various changes that could be understood by a person skilled in the art could be applied to the configurations and details of the invention.

INDUSTRIAL APPLICABILITY

As described above, according to the invention, scenarios that are necessary in training against targeted attacks can be generated automatically. The invention is useful in systems for countering targeted attacks.

REFERENCE SIGNS LIST

10 Security-training support apparatus (first example embodiment)
11 Information acquisition unit
12 Scenario generation unit
13 State specification unit
14 Storage unit
20 Database
21 Tactical information
22 Technical information
23 Software information
30 Security-training support apparatus (second example embodiment)
31 Attack control unit
40 Attack command server
50, 52 Terminal
51 Attack agent
110 Computer
111 CPU
112 Main memory
113 Storage device
114 Input interface
115 Display controller
116 Data reader/writer
117 Communication interface
118 Input equipment
119 Display device
120 Recording medium
121 Bus

What is claimed is:

1. A security-training support apparatus comprising:
at least one memory storing instructions; and
at least one processor configured to execute the instructions to:
acquire information specifying a set number of a chronological plurality of steps, in order to generate a scenario of a targeted attack by a virtual attacker which is formed from the chronological plurality of steps and in which processing is to be executed in each;
generate the scenario of the targeted attack by acquiring information specifying tactics, techniques, and software used by the virtual attacker, and by, until the set number is reached, for each step:
specifying a state of the virtual attacker and information acquired by the virtual attacker based on tactics, techniques, and software;
selecting the processing to be executed in the step from a database in which processing elements that can be executed in the step are registered, based on the state of the virtual attacker in an already-generated step in the scenario of the targeted attack.

2. The security-training support apparatus according to claim 1, wherein
the processing to be executed in each step is defined by the purpose of the step and a technique necessary for execution of the processing, and
the scenario of the targeted attack is further generated by, for each step:
selecting the purpose of the step from a database in which candidates of the purpose of the step are registered; and
selecting the technique necessary for the execution of the processing in the step from a database in which candidates of the technique that can be used for the execution of the processing in the step are registered.

3. The security-training support apparatus according to claim 1, wherein
the processing to be executed in each step is defined by a tactic to be deployed in the step, a technique to be used in the step, and software that is necessary for execution of the processing in the step, and
the scenario of the targeted attack is further generated by, for each step:
selecting the tactic to be deployed in the step from a database in which candidates of tactics that can be deployed in the step are registered;
selecting the technique to be used in the step from a database in which candidates of techniques that can be used in the step are registered; and
selecting the software that is necessary for the execution of the processing in the step from a database in which candidates of software that can be used for the execution of the processing in the step are registered.

4. The security-training support apparatus according to claim 1, wherein the scenario of the targeted attack is further generated by, for each step:
transmitting details of the step to a server that can execute a virtual targeted attack in accordance with the scenario of the targeted attack, the server to execute the generated step; and
acquiring an execution result.

5. A security-training support method performed by a computer and comprising:
acquiring information specifying a set number of a chronological plurality of steps, in order to generate a scenario of a targeted attack by a virtual attacker which is formed from the chronological plurality of steps and in which processing is to be executed in each step;
generating the scenario of the targeted attack by acquiring information specifying tactics, techniques, and software used by the virtual attacker, and by, until the set number is reached, for each step:
specifying a state of the virtual attacker and information acquired by the virtual attacker based on tactics, techniques, and software;
selecting the processing to be executed in the step from a database in which processing elements that can be executed in the step are registered, based on the state of the virtual attacker in an already-generated step in the scenario of the targeted attack.

6. The security-training support method according to claim 5, wherein
the processing to be executed in each step is defined by the purpose of the step and a technique necessary for execution of the processing, and
the scenario of the targeted attack is further generated by, for each step:
selecting the purpose of the step from a database in which candidates of the purpose of the step are registered; and
selecting the technique necessary for the execution of the processing in the step from a database in which candidates of the technique that can be used for the execution of the processing in the step are registered.

7. The security-training support method according to claim 5, wherein
the processing to be executed in each step is defined by a tactic to be deployed in the step, a technique to be used in the step, and software that is necessary for execution of the processing in the step, and
the scenario of the targeted attack is further generated by, for each step:
selecting the tactic to be deployed in the step from a database in which candidates of tactics that can be deployed in the step are registered;
selecting the technique to be used in the step from a database in which candidates of techniques that can be used in the step are registered; and
selecting the software that is necessary for the execution of the processing in the step from a database in which candidates of software that can be used for the execution of the processing in the step are registered.

8. The security-training support method according to claim 5, wherein the scenario of the targeted attack is further generated by, for each step:
causing transmitting details of the step to a server that can execute a virtual targeted attack in accordance with the scenario of the targeted attack, the server to execute the generated step; and
acquiring an execution result.

9. A non-transitory computer readable recording medium that includes storing a program that causes a computer to carry out:
acquiring information specifying a set number of a chronological plurality of steps, in order to generate a scenario of a targeted attack by a virtual attacker which is formed from the chronological plurality of steps and in which processing is to be executed in each step;
generating the scenario of the targeted attack by acquiring information specifying tactics, techniques, and software used by the virtual attacker, and by, until the set number is reached, for each step:

specifying a state of the virtual attacker and information acquired by the virtual attacker based on tactics, techniques, and software;

selecting the processing to be executed in the step from a database in which processing elements that can be executed in the step are registered, based on the state of the virtual attacker in an already-generated step in the scenario of the targeted attack.

10. The non-transitory computer readable recording medium according to claim 9, wherein the processing to be executed in each step is defined by the purpose of the step and a technique necessary for execution of the processing, and the scenario of the targeted attack is further generated by, for each step:

selecting the purpose of the step from a database in which candidates of the purpose of the step are registered; and selecting the technique necessary for the execution of the processing in the step from a database in which candidates of the technique that can be used for the execution of the processing in the step are registered.

11. The non-transitory computer readable recording medium according to claim 9, wherein the processing to be executed in each step is defined by a tactic to be deployed in the step, a technique to be used in the step, and software that is necessary for execution of the processing in the step, and the scenario of the targeted attack is further generated by, for each step:

selecting the tactic to be deployed in the step from a database in which candidates of tactics that can be deployed in the step are registered;

selecting the technique to be used in the step from a database in which candidates of techniques that can be used in the step are registered; and selecting the software that is necessary for the execution of the processing in the step from a database in which candidates of software that can be used for the execution of the processing in the step are registered.

12. The non-transitory computer readable recording medium according to claim 9, wherein the scenario of the targeted attack is further generated by, for each step:

causing transmitting details of the step to a server that can execute a virtual targeted attack in accordance with the scenario of the targeted attack, the server to execute the generated step; and acquiring an execution result.

* * * * *